Figure 1:
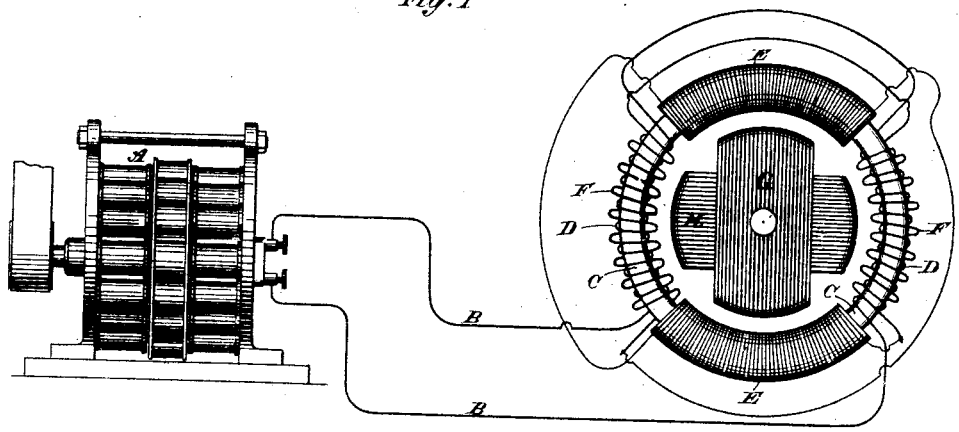

(No Model.)

N. TESLA.
ELECTRICAL TRANSMISSION OF POWER.

No. 511,915. Patented Jan. 2, 1894.

WITNESSES:
Raphaël Netter
H. F. Newbury

INVENTOR
Nikola Tesla
BY
Duncan, Curtis & Page
ATTORNEYS.

UNITED STATES PATENT OFFICE.

NIKOLA TESLA, OF NEW YORK, N. Y., ASSIGNOR TO THE TESLA ELECTRIC COMPANY, OF SAME PLACE.

ELECTRICAL TRANSMISSION OF POWER.

SPECIFICATION forming part of Letters Patent No. 511,915, dated January 2, 1894.

Original application filed May 15, 1888, Serial No. 273,993. Divided and this application filed December 3, 1888. Serial No. 292,475. (No model.)

*To all whom it may concern:*

Be it known that I, NIKOLA TESLA, from Smiljan, Lika, border country of Austria-Hungary, a subject of the Emperor of Austria-Hungary, residing at New York, in the county and State of New York, have invented a new and useful Method of Electrical Transmission of Power, of which the following is a description, this application being a division of an application filed by me on May 15, 1888, Serial No. 273,993, and for the method of operating motors contained in such application.

In former patents granted to me I have shown and described a system for the electrical transmission of power characterized by the following particulars: The motor contains independent energizing circuits and the generator has corresponding induced or current generating circuits which are connected by independent line circuits with those of the motor. The disposition of the generator coils is such that the currents developed in the circuits including them will have a certain difference of phase, for example, that the maximum periods of the currents generated in one of its circuits coincide with the minimum periods of the currents produced in the other circuit, and the corresponding energizing circuits of the motor are so arranged that the two currents co-operate to effect a progressive shifting of the magnetic poles or the points of maximum magnetic effect in the motor in consequence of which a rotation of its movable element is maintained.

My present invention involves this system of electrical power transmission; its distinguishing characteristic being the mode or method of generating or producing the alternating currents which run or operate the motor.

This invention is carried out in the following way: Instead of generating directly the alternating currents in each of the circuits which include the energizing coils of the motor, as by means of the induced coils of a magneto electric machine, I generate or produce an alternating current in but one of such circuits directly and by means of such current induce the proper current in the other energizing motor circuit. When the independent currents are both produced in the magneto machine it will be observed that the two line or transmitting circuits will of necessity extend the entire distance from the generator to the motor, but that by the method herein provided, one line circuit may be dispensed with as one circuit or that from the generator may be brought into the proper inductive relation to the other at any desired point.

The following is illustrative of the manner in which I carry out this invention: I employ as a motor, for example, a subdivided annular field magnet within which is mounted a suitable armature, such as a cylinder or disk wound with two coils at right angles, each of which is closed upon itself. On opposite sides of the annular field magnet I wind two coils of insulated wire of a size adapted to carry the current from the generator. Over these coils or close to them in any of the well understood ways I wind secondary coils. I also wind on the annular field magnet midway between the first mentioned coils a pair of coils which I connect up in circuit with the secondary coils. The last pair of coils I make of finer wire than the main or line and secondary coils and with a greater number of convolutions that they may have a greater relative magnetizing and retarding effect than either of the others. By connecting up the main coils in circuit with a generator of alternating currents the armature of the motor will be rotated. It is probable that this action is explained by the following theory: A current impulse on the line passing through the main coils establishes the magnetic poles of the annular field magnets at points midway between said coils. But this impulse produces in the secondary coils a current which, circulating through the second pair of energizing coils tends to establish the poles at points ninety degrees removed from their first position with the result of producing a movement or shifting of the poles in obedience to the combined magnetizing effect of the two sets of coils. This shifting continued by each successive current impulse establishes what may be termed a rotary effort and operates to maintain the armature in rotation.

Figure 2:
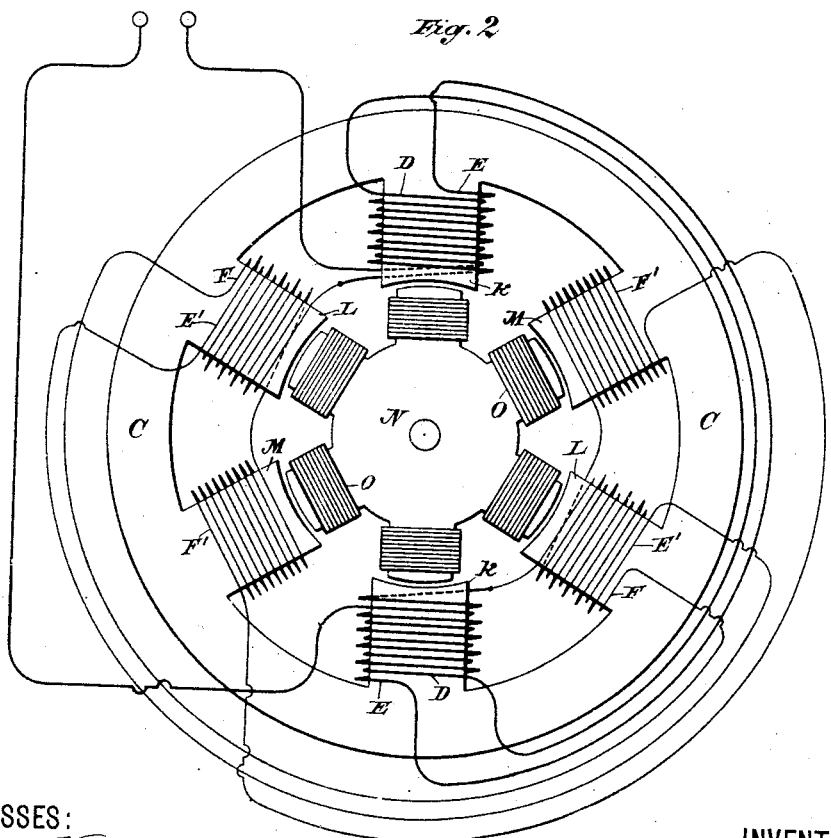

In the drawings annexed I have shown in Figure 1 an alternating current generator connected with a motor, shown diagrammatically and constructed in accordance with my invention, and in Fig. 2 a diagram of a modified form of motor.

A designates any ordinary form of alternating current generator and B B the line wires for connecting the same with the motor.

C is the annular field magnet of the motor.

D D are two main coils wound on opposite sides of the ring or annular field and connected up with the line, and having a tendency to magnetize the ring C with opposite poles midway between the two coils.

E E are two other magnetizing coils wound midway between coils D D, but having a stronger magnetizing influence for a current of given strength than coils D D.

F F are the secondary coils which are associated with the main coils D D. They are in circuits which include the coils E E respectively, the connections being made in such order that currents induced in coils F and circulating in coils E will act in opposition to those in coils D in so far only as the location of the magnetic poles in the ring C is concerned.

The armature may be of any of the forms used by me in my alternating current system and is shown as wound with two closed coils G H at right angles to each other.

In order to prolong the magnetizing effect of the induced currents in producing a shifting of the poles, I have carried the principle of the construction exhibited in Fig. 1 farther, thereby obtaining a stronger and better rotary effect.

Referring to Fig. 2, C is an annular field magnet having three pairs or oppositely located sets of polar projections K L M. Upon one pair of these projections, as K, the main energizing coils D are wound. Over these are wound the secondary coils E. On the next polar projections L L are wound the second energizing coils F which are in circuit with coils E. Tertiary induced coils E' are then wound over the coils F and on the remaining polar projections M the third energizing coils F' are wound and connected up in the circuit of the tertiary coils E'. The cylindrical or disk armature core N in this motor has polar projections wound with coils O forming closed circuits. My object in constructing the motor in this way is to effect more perfectly a shifting of the points of maximum magnetic effect. For assuming the operation of the motor to be due to the action above set forth—the first effect of a current impulse in this motor will be to magnetize the pole pieces K K, but the current thereby induced in coils E magnetizes the pole pieces L and the current induced in turn in coils E' magnetizes the pole pieces M. The pole pieces are not magnetized, at least to their full extent, simultaneously by this means, but there is enough of a retardation or delay to produce a rotary effect or influence upon the armature. The application of this principle is not limited to the special forms of motor herein shown, as any of the double circuit alternating current motors invented by me and described in former Letters Patent to me may be adapted to the same purpose. This method or mode of producing the currents in the independent energizing circuits of the motor may be carried out in various ways, and it is not material to the invention broadly considered, what devices be employed in effecting the result, viz: the induction from or by the current from the generator or source, of the current or currents which co-operate therewith in producing the rotation of the motor.

I would state that in using the word generator, I mean either a primary generator, such as a magneto machine, or a secondary generator, such as an electrical converter, and in claiming protection for inducing the current in one set of energizing coils by the current which circulates in another, I would be understood as including the induction of the secondary current from the current from the same source as that which traverses the motor coils whether it be flowing in the same branch or part of the circuit or not.

What I claim is—

1. The method of operating electro-magnetic motors having independent energizing circuits, as herein described, which consists in passing an alternating current through one of the energizing circuits and inducing by such current the current in the other energizing circuit of the motor, as set forth.

2. The method of operating electro-magnetic motors having independent energizing circuits as herein described, which consists in developing an alternating current in one of said energizing circuits and inducing thereby currents in the other energizing circuit or circuits, as herein set forth.

NIKOLA TESLA.

Witnesses:
GEO. N. MONRO,
EDWARD T. EVANS.